July 9, 1957  J. A. TERRICK  2,798,770
LATCHING DEVICE FOR AUTOMOTIVE WHEELS
Filed Feb. 21, 1955  2 Sheets-Sheet 2
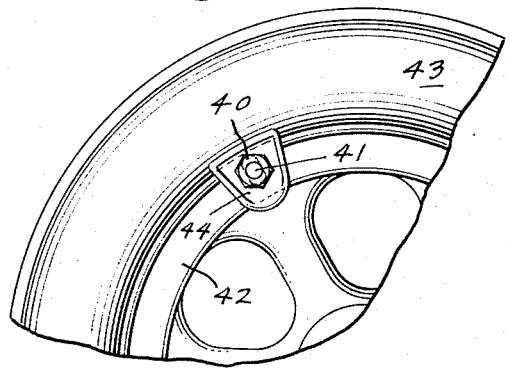
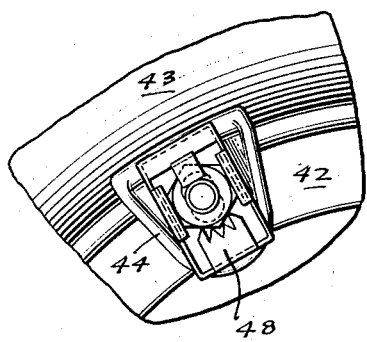
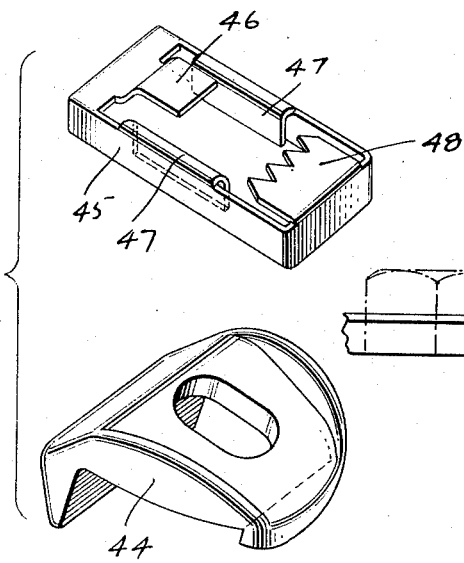
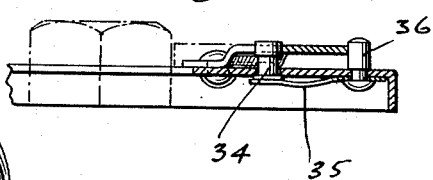
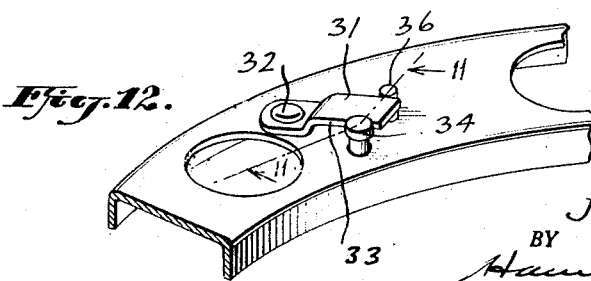
INVENTOR.
JOSEPH A. TERRICK.
BY
ATTORNEY.

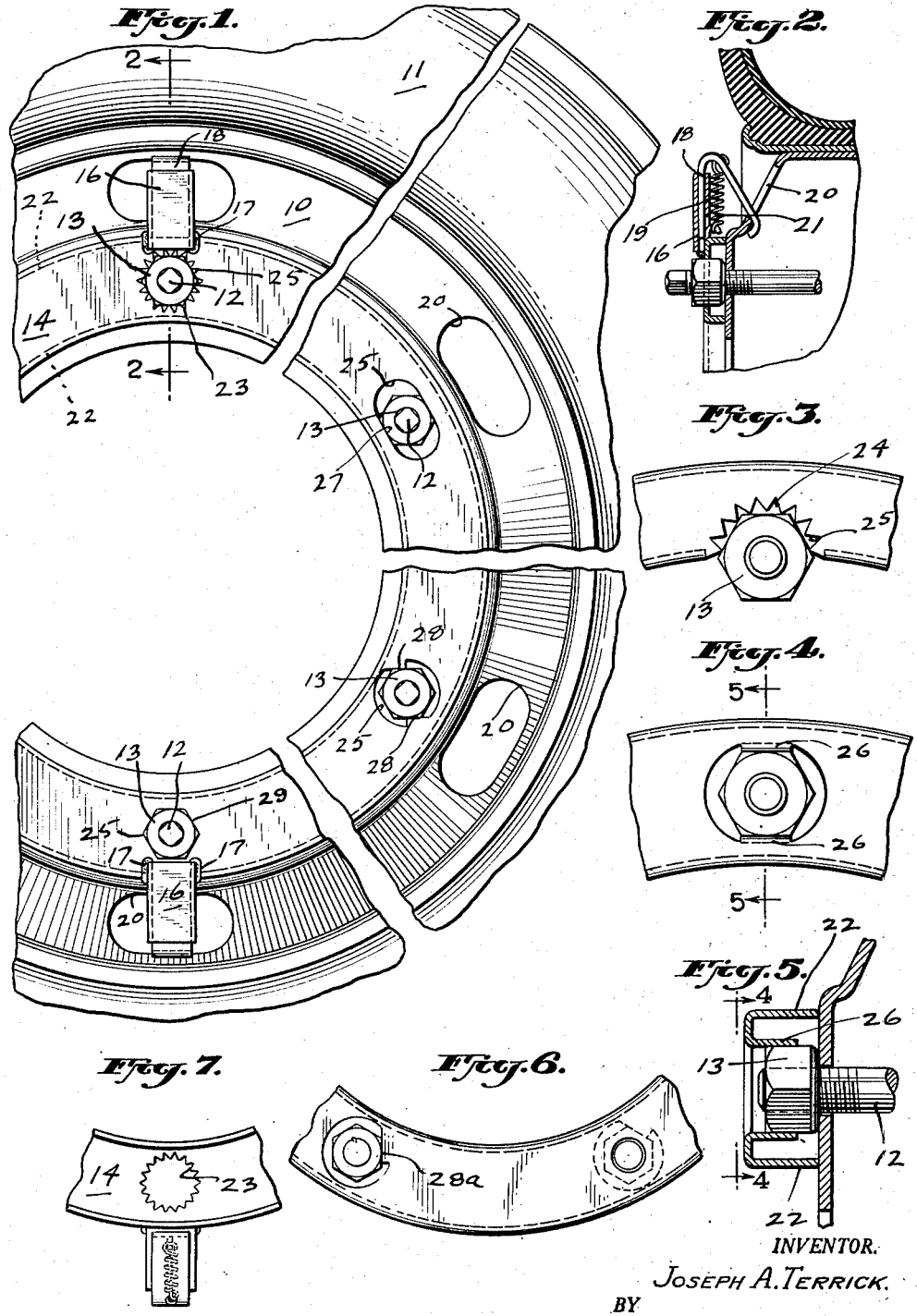

United States Patent Office 2,798,770
Patented July 9, 1957

2,798,770

LATCHING DEVICE FOR AUTOMOTIVE WHEELS

Joseph A. Terrick, Newark, N. J., assignor of one-half to William F. Dester, Chatham, N. J.

Application February 21, 1955, Serial No. 489,459

7 Claims. (Cl. 301—9)

This invention relates to the art of automotive wheels and more particularly to the provision of latching devices to preclude accidental disengagement of nut members which are threaded onto bolt shanks on such wheels. Pursuant to the invention, a novel device is provided for the latching purpose above mentioned, including a plate member having brackets extending therefrom with anchor fingers to engage the truck wheel openings, in the Fig. 1 form, to secure the plate thereto. Means are provided on the plate member to engage the nut members to preclude their disengagement from the bolt shanks, as shown in the various figures of the drawings, below more particularly described.

These and other advantageous objects, which will appear from the drawings and from the description hereinafter, are accomplished by the structure of my invention, of which an embodiment is illustrated in the drawings. It will be apparent, from a consideration of said drawings and the following description, that the invention may be embodied in other forms suggested thereby, and such other forms as come within the scope of the appended claims are to be considered within the scope and purview of the instant invention.

In the drawings:

Fig. 1 is a fragmentary elevational view of an automotive wheel provided with a latching device of this invention.

Fig. 2 is a fragmentary vertical sectional view taken on line 2—2 of Fig. 1,

Fig. 3 is a fragmentary plan view of another form of plate which may be utilized in carrying out the invention, Fig. 4 is a similar view of a further modification of the plate member, taken on line 4—4 of Fig. 5, Fig. 5 is a transverse sectional view taken on line 5—5 of Fig. 4, Fig. 6 is an elevational fragmentary view of another form of plate member embodying the invention, Fig. 7 is a fragmentary, rear elevational view of a portion of the plate member shown in Fig. 1, Fig. 8 is a fragmentary elevational view of a spoke wheel, in which the tire and ring thereof are secured to the wheel rim by a stud member positioned over the shank on said wheel, with a latch device of this invention disposed thereon, Fig. 9 is an enlarged fragmentary view of the stud and adjacent portions shown in Fig. 8, showing the application of the form of invention further shown in exploded, perspective form in Fig. 10, Fig. 11 is a vertical sectional view taken on line 11—11 of Fig. 12, and Fig. 12 is a fragmentary perspective view of a modified form of the invention.

As shown in the drawings, the latching device of this invention is adapted for application to automotive wheels, such as for example, fragmentarily shown in Fig. 1 and therein designated by the reference character 10. Said automotive wheel conventionally has a tire 11 and a plurality of bolts 12 to secure the wheel to the chassis, nut members 13 being threaded over the bolts 12 for the purpose. Pursuant to the present invention, a latching device is provided to preclude accidental disengagement of the truck wheel nut members from the bolt shanks. Said device comprises, as shown in Fig. 1, a plate 14 provided with a plurality of apertures 25 through which the bolt shanks 12 pass, the nut members 13 being threaded thereon. Pursuant to the present invention, means are provided for registration with the nut members to preclude their accidental rotation, as presently more particularly described.

The plate 14 is provided with two or more brackets 16 which may be extended from the material of the plate or may be separately formed and welded thereto, as at 17. Anchor fingers 18 are slidably disposed in said brackets 16, as, for example, by forming said brackets of channeled cross section, as indicated at 19 in Fig. 2. The parts are so proportioned that the fingers 18 may be moved through the apertures 20 of the automotive wheel 10 and thereby into engagement with the wheel to secure the plate thereto. The fingers may be urged into such engagement with the wheel under tension, as for example, by means of the springs 21 (Fig. 2) secured at opposite ends to the fingers and to the brackets. The plate 14 is preferably of channeled cross section, being essentially of U-shaped outline as shown in Fig. 1 in dotted lines and cross sectionally in Fig. 5, opening toward the wheel and being spaced therefrom by the legs 22. The plate member is provided with means to engage the nut members to preclude their disengagement from the bolt shanks. Said means may comprise forming the apertures 25 in the plate member of marginally pointed positions 23 as shown in Figs. 1 and 7, proportioned to engage the bolt to preclude its accidental disengagement; in the form shown in Fig. 3, the plate 14 may be made of lesser and proportions intermediate the leg members 22 thereof, in which case the points 24 of the apertures 25 thereof would be, for example, approximately semicircular, so that said aperture 25 would open medially. The means on the plate to engage the nut members may comprise flat portions 26 of the plate, proportioned to engage the bolt to preclude its accidental disengagement as shown in Figs. 4 and 5, or may comprise forming certain marginal edges of the apertures 25 flat as shown at 27 in Fig. 1 and in another form at 28 in said figure, and at 28a in Fig. 6, or the aperture 25 may be cut to precisely the outline of the nut member, as shown at 29 in Fig. 1. In the form shown in Fig. 12, flat stud 31 is pivotally mounted as at 32 on the plate adjacent the aperture 25 and is formed with a flat surface 33 which, when the stud is moved past the pin 34, will engage the stud member in much the manner in which flat portion 26 of the plate as shown in Fig. 4, registers with surface of the nut member to preclude rotation. The pin 34 (Fig. 12) is normally held in the plane of rotation of stud 31 by suitable means such as by a spring 35 as shown in Fig. 11 and therefore normally precludes rotation thereof. A fixed pin 36 precludes accidental movement of the stud away from the nut member; said stud is normally disposed as shown in Fig. 12 between the pins 34, 36. To rotate the stud past the pin 34, the latter is manually depressed and then, when the stud 31 is so rotated past pin 34, the latter is permitted to rise responsive to the spring 35 and block accidental return of the stud to its Figure 12 position.

In Figs. 8, 9 and 10, a form of the invention is shown wherein a latching device precludes accidental disengagement of a nut member 40 threaded onto a bolt shank 41 of an automotive wheel to secure tire 43 to the spoke wheel rim 42. In that form of automotive wheel, a stud 44 is positioned over the bolt shank. The device of the invention comprises a frame 45 adapted to be positioned on the stud, as shown, for example, in Fig. 9, said frame having a spring tongue 46 to engage the bolt shank 41 to preclude displacement of the latching device frame 45 therefrom. Flat sections 47 are provided on the latching device 45 to engage the nut member 40 to preclude rotation thereof. A pointed finger 48 is provided on the frame to engage the bolt shank 41 at a point opposite the spring tongue 46.

It will be noted in Fig. 1 that various means may be provided on the plate 14 for registry with the nut members to preclude accidental rotation thereof; said means, as shown in the drawings and described herein, and others suggested thereby, shall be deemed within the scope and purview of the present invention and covered by the appended claims.

Having thus described my invention, what I claim as new and desire to secure by Letters Patent is:

1. A latching device to preclude accidental disengagement of an automotive wheel nut member threaded onto a bolt shank of an automotive wheel having apertures therein, said device comprising a plate, a plurality of brackets secured to and extending from said plate spaced therefrom parallel to the axial plane of the plate, anchor fingers longitudinally slidably disposed in said brackets, the parts being so proportioned that said fingers may be moved through the apertures, spring means urging said fingers radially inwardly and thereby into engagement with the wheel to secure the plate thereto, and means on said plate to engage the nut member to preclude its disengagement from the bolt shank.

2. In a latching device as set forth in claim 1, said plate member being of channeled cross section.

3. In a latching device as set forth in claim 1, said plate member being of U-shaped cross section and, when so disposed on the wheel, opening toward the wheel.

4. In a latching device as set forth in claim 1, said means on said plate to engage the nut member comprising apertures in said plate member defined by points proportioned to engage the bolt to preclude its said accidental disengagement.

5. In a latching device as set forth in claim 1, said means on said plate to engage the nut member comprising flat portions proportioned to engage the bolt to preclude its said accidental disengagement.

6. In a latching device as set forth in claim 1, said means on said plate to engage the nut member comprising apertures in said plate member, and flat studs on said plate in registry with the apertures and proportioned to engage the bolt to preclude its said accidental disengagement.

7. In a latching device as set forth in claim 1, said means on said plate to engage the nut member comprising an aperture in said plate member, a pivotally mounted flat stud disposed adjacent the aperture for movement into registry with the bolt, and means to hold the stud in said position of registry.

References Cited in the file of this patent

UNITED STATES PATENTS

| | | |
|---|---|---|
| 767,694 | Jarrell | Aug. 16, 1904 |
| 848,541 | Ellis | Mar. 26, 1907 |
| 1,843,985 | Nelson | Feb. 9, 1932 |
| 2,225,132 | Seaman | Dec. 17, 1940 |
| 2,626,837 | Wilson et al. | Jan. 27, 1953 |
| 2,722,460 | Dieterich | Nov. 1, 1955 |

FOREIGN PATENTS

| | | |
|---|---|---|
| 460,832 | Germany | Sept. 19, 1929 |
| 519,260 | Great Britain | Mar. 20, 1940 |